March 6, 1951 C. I. GLASSBROOK 2,544,078
RADIO FREQUENCY SPECTROMETER
Filed March 7, 1946
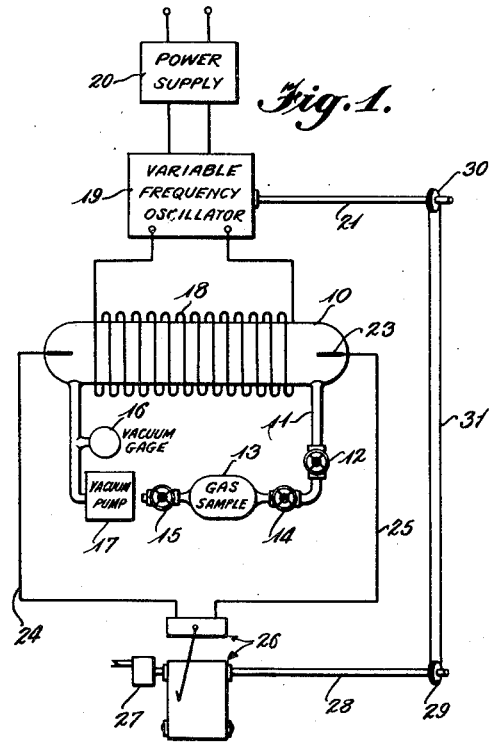
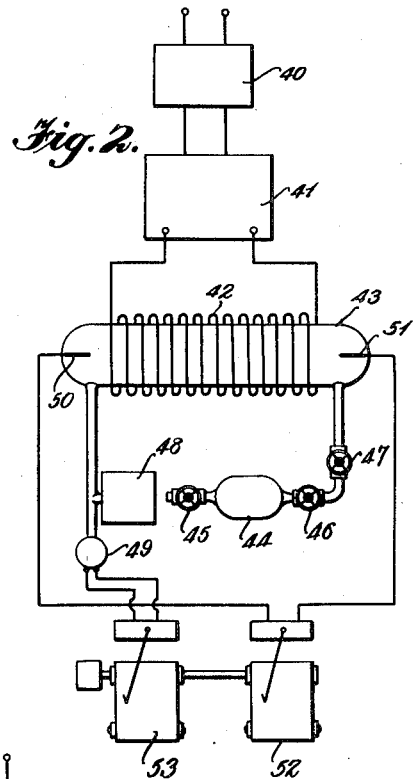
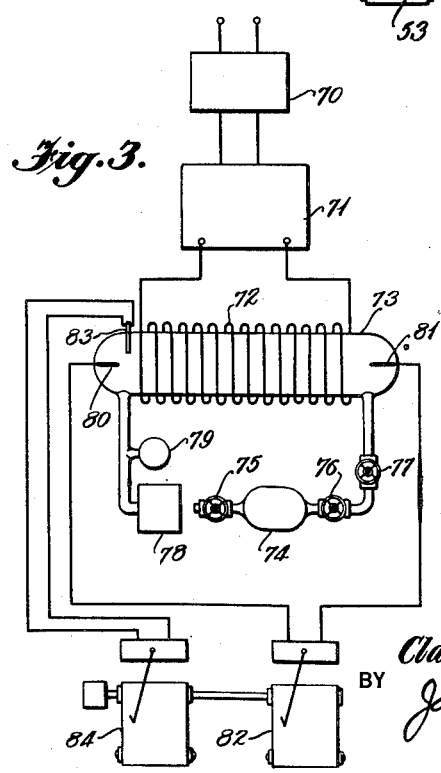
INVENTOR
Clarence I. Glassbrook
BY James Y. Cleveland
ATTORNEY Patented Mar. 6, 1951

2,544,078

UNITED STATES PATENT OFFICE 2,544,078

RADIO-FREQUENCY SPECTROMETER

Clarence I. Glassbrook, Glen Echo Farm, N. J., assignor to Socony-Vacuum Oil Company, Incorporated, a corporation of New York Application March 7, 1946, Serial No. 652,770

6 Claims. (Cl. 175—183)

This invention relates to a method and apparatus for chemical analysis, and more particularly to a method and apparatus for performing chemical analyses of materials in a gaseous state by subjecting the material or materials to be analyzed to a high frequency electrical field and measuring the effect of this field on the material or materials to be analyzed.

The analysis of complex mixtures and the control of industrial process operations has been studied by many investigators and a variety of equipment has been developed for carrying out various analytical and control functions. For example, a mixture of paraffinic hydrocarbons, such as neohexane and carbon disulfide, can be analyzed by means of the infrared spectrograph which compares their absorption of energy in the infrared region at various frequencies. In a similar manner, a mixture of methane, ethane and propane may be passed through a mass spectrograph in order to secure an analysis of the mixture or to control refinery equipment employed for the fractionation of methane from ethane and propane.

While the instruments above described have been used in industry, they are exceedingly complicated and expensive. Accordingly, it is customary to provide technically trained operators or supervisors to insure their correct functioning. At the same time, because of the use of rock salt optics in the infrared instrument and the use of high vacuum glass systems in mass spectrometers, the instruments are rather delicate for plant use. Because of their precise nature, they also require very accurate control and hence complicated auxiliary equipment.

Many disadvantages of previously known types of equipment have been overcome as a result of the development of the method and apparatus of this invention. In accordance with the principles of this invention, the materials to be analyzed may be simply and expeditiously analyzed by subjecting them to a high frequency electrical field, varying some parameter of the system that will vary the effect of the high frequency field on the materials, measuring the effect of the high frequency electrical field on the materials during the variation, and correlating the variation with the measurements made during the variation.

Since such variations have been found to effect different materials in a different manner or to a different degree, the correlation of the variation with the effect has been found to give an indication of the composition of the materials.

Thus, if a hydrocarbon, in gaseous form, is subjected to a high frequency electrical field, sufficient to produce a glow, an electrical current is produced between two electrodes inserted into the glow. If the frequency is varied, the current varies, and this variation in current, with a given variation in frequency, differs for different materials.

Similarly, if a gas is subjected to a high frequency electrical field sufficient to produce a glow, the current measured between two electrodes placed in the glow, and the pressure of the gas is changed, the amount of current is also changed. This change, again, depends upon the nature of the gas, and hence by correlating the change in pressure to the change in observed current, an indication of the chemical composition of the material being analyzed is obtained. In a similar manner, analyses may be made by varying the strength of the electrical field or by varying the temperature of the gas being analyzed.

A peculiar feature of the present invention lies in the fact that when a gas is subjected to such a high frequency electrical field and a pair of electrodes are placed in the glow, the current flow between the electrodes is uni-directional, that is, it is not an alternating current, although its direction may, in some instances, change during an analysis. As a result, the current generated may be measured by a direct current ammeter, or the potential developed may be measured by direct current voltmeter. Even when the direction of the current changes during an analysis, the shape of the curve which results is still characteristic of the material being analyzed.

The reasons for this phenomena are not altogether clear. The action of the gas being analyzed and the electrodes placed in it have been compared to the ordinary gas rectifier and it appears that the two electrodes and the gas between them may act as a geseous rectifier. However, it has not been found necessary to make one electrode pointed and the other flat as is the case in the usual gas rectifier, the current flow being uni-directional, even if the electrodes are as nearly alike as it is possible to make them. It may be that it is not practically possible to make the electrodes exactly alike and hence that they act in the same manner as electrodes in a gaseous rectifier, even though they are not deliberately shaped as such electrodes ordinarily are.

Regardless of the theory upon which the unidirectional current is produced as a result of the application of a high frequency electrical field, the fact remains that the current produced is uni-directional and can be measured by direct current equipment.

In the preferred embodiment of this invention, a gaseous material to be analyzed is placed in a high frequency electrical field and two electrodes are placed in the gaseous material. These two electrodes are connected to a direct current recording ammeter of the required sensitivity and the record surface of the recorder is moved in accordance with a variation of some parameter of the arrangement that has been found to effect a variation in the amount of current produced, which variation, in some way, depends upon the composition of the material being analyzed. Thus, the record produced is a graph of the variation of some parameter of the arrangement versus current flow. Alternatively, the variation in the parameter being changed and the variation in the current, or potential, being measured, may be separately recorded in correlation with time, and the records thereafter combined to give a graph of the varying parameter versus the observed measurement.

The high frequency to be used is preferably in the neighborhood of 5 to 15 megacycles and the strength of the electrical field is such as to produce a glow and an easily measurable voltage or current flow, taking into consideration the size and shape of the chamber which holds the gas being analyzed. Pressures of around 10 microns of mercury have been found satisfactory, and pressures down to a fraction of a micron or up to 30 or 40 microns of mercury can be used. The gas is usually passed into the device at substantially room temperature, and is heated somewhat by the operation of the device. It may, however, be refrigerated before being analyzed, or may be heated before it enters the analyzing chamber.

For a more detailed understanding of the principles of this invention and of a device suitable for accomplishing it, reference may be had to the appended drawings and to the following detailed description thereof.

In the drawings:

Figure 1 is a schematic illustration of a device embodying the principles of this invention, in which the analysis is performed by measuring the effect of changes in frequency;

Figure 2 is a schematic illustration of a device embodying the principles of this invention, in which the analysis is performed by recording the effect of changes in pressure; and Figure 3 is a schematic illustration of a device embodying the principles of this invention, in which the analysis is performed by observing the effects of the changes in temperature.

As illustrated in Figure 1, a suitable apparatus for the practice of this invention comprises a testing chamber 10, preferably of glass, into which the gas or vapor samples to be tested may be introduced through appropriate tubing 11 and valve 12 from a sample container 13 having valves 14 and 15 at its ends to facilitate its charging and discharging, in the usual manner. A vacuum gauge 16 and a vacuum pump 17 are connected to the opposite end of the testing chamber 10 to control the pressure in the chamber and flush the chamber between tests.

Surrounding the center portion of the testing chamber 10 is an induction coil 18 connected to a variable frequency oscillator 19 so as to produce the desired high frequency field within the testing chamber. The variable frequency oscillator 19 is supplied with power from any suitable power supply 20 and its frequency is varied by the rotation of a shaft 21. No means are shown to accomplish this variation in frequency with the rotation of the shaft 21, but any known means may be used. For example, shaft 21 may be caused to rotate the plates in a variable condenser, or change an inductance in the circuit of the oscillator.

Although the coil which produces the high frequency field is shown as outside the gas chamber, it may be located inside of the chamber if desired. Furthermore, it has been found desirable in some instances to make the coil in the form of an air-core transformer, the primary of which is fed from the oscillator and the secondary of which is a part of a tuned circuit which will greatly increase the voltage producing the high frequency field.

In order to measure the current flow or potential resulting from the impression of the high frequency electrical field on the gas and vapor under test, a pair of electrodes 22 and 23 are placed in the ends of the test chamber 10 and these are connected by appropriate connectors 24 and 25 to a recorder 26. If desired, an electrical amplifier may be inserted between the electrodes and the recorder. The tape of the recorder is driven by any suitable means 27, and connections are provided so that the shaft 21 which varies the frequency of the oscillator is rotated in accordance with the movement of the recorder tape. As illustrated, these connections may consist of an extension of the recorder shaft 28, pulleys 29 and 30 on the recorder shaft 28, and the oscillator shaft 21, respectively, and a belt 31 connecting the two pulleys.

As illustrated in Figure 2, a generally similar device may be used for measuring the effects of changes in pressure. Such a device may comprise a power source 40, an oscillator 41 which has an output of fixed frequency, and an exciter coil 42 which surrounds a gas chamber 43. Gas is supplied to this chamber from a sample bottle 44 and suitable valves 45, 46 and 47 are provided to facilitate this operation. The vacuum is produced by a vacuum pump 48, and this vacuum is measured by a vacuum gauge 49. Current flow is measured as before by the use of electrodes 50 and 51 inserted in the gas chamber and connected to a recorder 52. The vacuum gauge 49 is also connected by suitable connection to a recorder 53 which is driven synchronously with or connected on the same shaft as the recorder 52, in such a manner that the pressure in the analyzer chamber may be recorded in correlation with the measurements of current. Since it is not simple to move the tape of the recorder 52, that records the current being measured, in accordance with the pressure in the chamber, it is usually easier to separately record the pressure in the chamber, in correlation with time, record the measurements of current, also in correlation with time, and thereafter combine the records to produce a graph of pressure versus current flow.

A similar arrangement may also be used to correlate changes in temperature with changes in current measurement. Such an arrangement is shown schematically in Figure 3. In this figure, current is supplied from a power source 70 to an oscillator 71, which in turn supplies high frequency current to an exciter coil 72 which surrounds a gas chamber 73. The gas being analyzed is supplied in a similar manner from a sample bottle 74 under the control of valves 75, 76, and 77. Vacuum is produced by a vacuum pump 78 and measured by a vacuum gauge 79. Electrodes 80 and 81 are provided in the ends of the gas chamber and connected to a recorder 82, also as in the previously described figure.

In order to measure the temperature of the gas in the analyzer chamber 73, a thermocouple or other temperature measuring device 83 is provided and connected to a recorder 84, driven either by the same shaft as the recorder 82 or synchronously therewith. Obviously, if the temperature responsive element 83 is a thermocouple a necessary cold junction will be provided at its surface. In using this arrangement, gas may be admitted to the testing chamber and heated by the high frequency field while the necessary records are being made. If necessary, additional heating, or cooling, means may be provided for the gas being analyzed.

In the same manner that the variations in pressure and variations in current were recorded and later combined in accordance with Figure 3, so may the records of temperature and current be combined in a subsequent step to produce a direct graph of temperature versus current flow.

A schematic showing of a device for varying the intensity of electrical radiation and recording the corresponding variations in current flow would appear exactly like Figure 1, except that the variable frequency oscillator 19 would be a variable strength oscillator and the strength of the output rather than the frequency would be varied in accordance with the movements of the recorder tape.

The details of the method and apparatus of this invention may obviously be varied in many minor respects without departing from the basic principles.

What is claimed is:

1. A method of chemical analysis that comprises subjecting material to be analyzed in gaseous form, to radio frequency electromagnetic radiations, measuring direct current flow between electrodes which contact the material at spaced points, varying the frequency of said electromagnetic radiations and correlating the variations in the said frequency with the variations in direct current flow to produce an indication of the composition of the gas.

2. A method of chemical analysis that comprises subjecting material to be analyzed in gaseous form, to radio frequency electromagnetic radiations, measuring the direct current potential between electrodes which contact the material at spaced points, varying the frequency of the electromagnetic radiations and correlating the variations in the said frequency with the variations in direct current flow to produce an indication of the composition of the gas.

3. A method of chemical analysis that comprises subjecting material to be analyzed in gaseous form, to radio frequency electromagnetic radiations, measuring direct current flow between electrodes which contact the material at spaced points, varying the pressure of the gas being analyzed, and correlating the variations in the said pressure with the variations in direct current flow to produce an indication of the composition of the gas.

4. A method of chemical analysis that comprises subjecting material to be analyzed in gaseous form, to radio frequency electromagnetic radiations, measuring the direct current potential between electrodes which contact the material at spaced points, varying the pressure of the gas being analyzed and correlating the variations in the said pressure with the variations in direct current potential to produce an indication of the composition of the gas.

5. A method of chemical analysis that comprises subjecting material to be analyzed in gaseous form, to radio frequency electromagnetic radiations, measuring direct current flow between electrodes which contact the material at spaced points, varying the temperature of the gas being analyzed, and correlating the variations in the said temperature with the variations in direct current flow to produce an indication of the composition of the gas.

6. A method of chemical analysis that comprises subjecting material to be analyzed in gaseous form, to radio frequency electromagnetic radiations, measuring the direct current potential between electrodes which contact the material at spaced points, varying the temperature of the gas being analyzed, and correlating the variations in the said temperature with the variations in direct current potential to produce an indication of the composition of the gas.

CLARENCE I. GLASSBROOK.

REFERENCES CITED

The following references are of record in the file of this patent:

UNITED STATES PATENTS

| Number | Name | Date |
| --- | --- | --- |
| 1,377,282 | Schafer | May 10, 1921 |
| 1,904,059 | Kubach | Apr. 18, 1933 |
| 2,081,429 | Gaede | May 25, 1937 |
| 2,149,847 | Kolin | Mar. 7, 1939 |
| 2,152,639 | Edgerton | Apr. 4, 1939 |
| 2,393,650 | Metcalf | Jan. 29, 1946 |